United States Patent [19]

Fandrich

[11] Patent Number: 4,662,414

[45] Date of Patent: May 5, 1987

[54] APPARATUS AND METHOD FOR COLLECTING A TREE TOP

[76] Inventor: Helmut E. Fandrich, 2461 Sunnyside Place, Clearbrook, B.C., Canada, V2T 4C4

[21] Appl. No.: 836,306

[22] Filed: Mar. 5, 1986

[51] Int. Cl.⁴ ............................................. A01G 23/08
[52] U.S. Cl. .................................. 144/335; 30/379.5; 56/336; 144/3 D
[58] Field of Search .................. 144/2 Z, 3 D, 34 R, 144/34 E, 335, 343; 30/374.5; 56/336

[56] References Cited

U.S. PATENT DOCUMENTS

| | | | |
|---|---|---|---|
| 4,792 | 10/1846 | Gatherer | 56/336 |
| 1,795,392 | 3/1931 | Hardwick | 56/336 |
| 3,507,107 | 4/1970 | Harms et al. | 56/336 |
| 3,536,113 | 10/1970 | Sutherland | 144/2 Z |
| 3,576,203 | 4/1971 | Cote | 144/2 Z |

Primary Examiner—W. D. Bray
Attorney, Agent, or Firm—Hughes & Cassidy

[57] ABSTRACT

Apparatus is lowered over the top of a tree to sever the tree top and to collect the severed tree for later use in reforestation. The apparatus includes a housing having a conically shaped inner passageway which diverges downwardly to provide a lower opening for guiding the tree upwardly through the downwardly diverging passageway to provide a lower opening for guiding the tree upwardly through the passageway and out the top of the conical housing. In an exemplary embodiment, the cutting assembly includes a movable engaging arm which is propelled in scissor-like movement toward a fixed engaging arm by a fluid cylinder/piston assembly. The inner edges of the arms are shaped to guide the tree toward a cutting blade attached to the inner edge of one of the arms. The tree is moved into cutting engagement with the cutting blade by the closing movement of the movable arm. An extension spring may be utilized to assist in the opening and closing movement of the movable arm by movement of the spring across an overcenter location. In another exemplary embodiment, the cutting blade is pivotally connected to one of the arms and is rotated into cutting engagement with the tree by a separate hydraulic piston/cylinder assembly.

30 Claims, 18 Drawing Figures

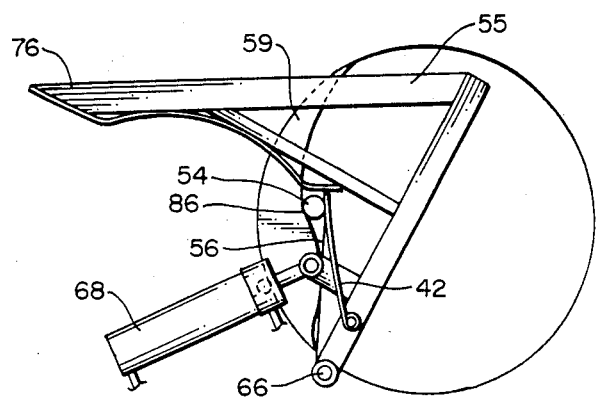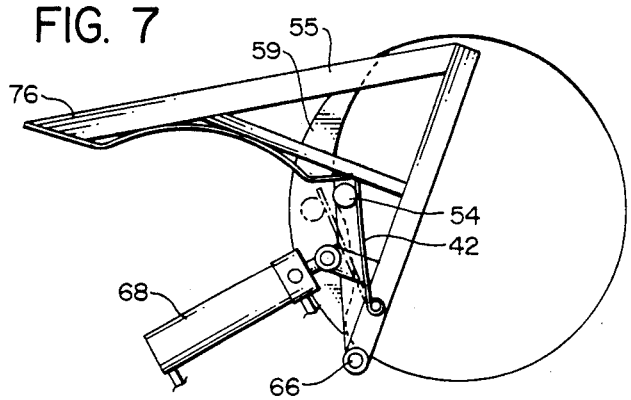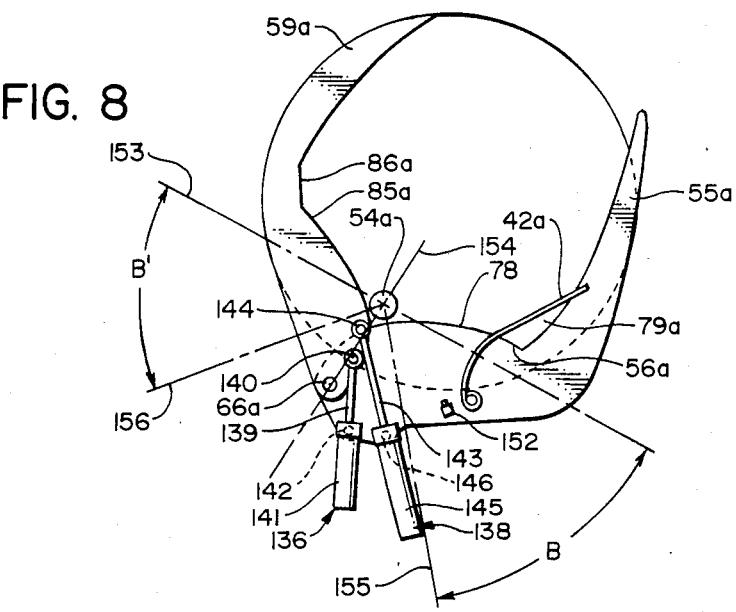

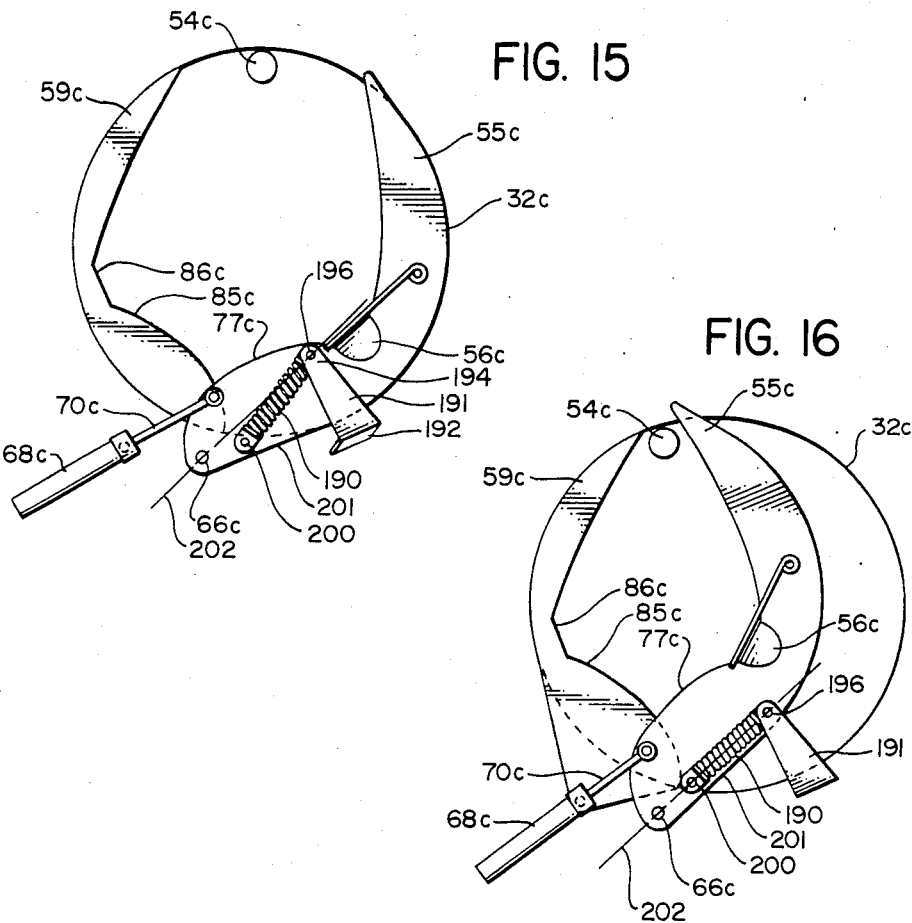
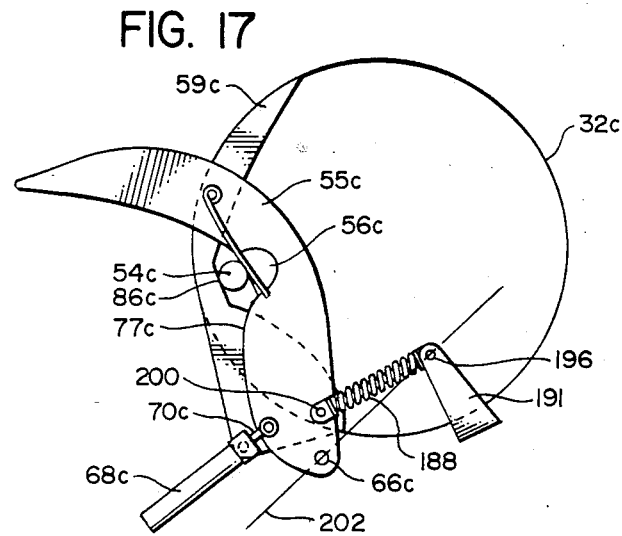

APPARATUS AND METHOD FOR COLLECTING A TREE TOP

TECHNICAL FIELD

The present invention relates to apparatus and methods for severing the top of a tree and for collecting the severed top, and more particularly to apparatus and methods for lowering a conical housing over the top of the tree in order to encircle the tree and to permit a cutting member to sever the tree top.

BACKGROUND OF THE INVENTION

Reforestation of coniferous trees is accomplished by collecting seeds from the tree's cones and planting these seeds at selected locations. Typically however, the majority of the seeds are located in cones near the top of the tree trunk. Since many of the trees grow to great heights, the collection of these seed bearing cones can sometimes present a problem.

Due to the height of the tree tops it has sometimes been desirable to use a helicopter to collect these seed bearing cones. A common method of collecting these cones has been to hover the aircraft adjacent to the top of the tree, while an operator with a chain saw or hydraulic shear extends his body outwardly from the cab of the helicopter and severs the tree top with a chain saw. The severed tree top is either pulled into the helicopter, or allowed to fall to the ground where it is collected by personnel on the ground.

Aside from the obvious dangers to the chain saw operator by extending himself outside an airborne aircraft while operating the chain saw or hydraulic shears, the helicopter must hover sufficiently close to the tree so that the tree top is within access of the operator. In addition, only a small top portion of the tree can be severed at one cutting, as the helicopter must hover at a sufficient height above the tree to avoid impacting the tree with the helicopter rotor blades. Furthermore, the collection of the severed trees on the ground requires additional personnel.

Devices for removing branches or severing the trunk of a tree have been disclosed in the following patents. In U.S. Pat. Nos. 3,529,642 and 3,532,141—by Kamner et al, there is disclosed a tree harvesting device including a hydraulically actuated shear which is suspended on a telescopic boom from the ground for attachment to the upper portion of the tree. The shear includes an upper section which grasps the tree, and a lower section which is vertically extendable downwardly to first delimb the tree, and then to support the shear assembly at the new downward location. After the lower section delimbs the tree, the upper section severs the trunk of the tree, and then moves downward towards the lower section, to support the lower section in subsequent downward delimbing movement of the lower section.

A cutter assembly for delimbing trees is further shown in U.S. Pat. No. 3,183,949—by Larson, wherein the cutter assembly includes a cutting head having a pair of concave arms biased into closing engagement with the tree trunk. The arms include knife edges which generate a vertical cutting action as the cutting head is moved along an upstanding mast in vertical movement against the outwardly extending limbs of the tree.

Another device for removing branches from a tree and which is lowered by a helicopter over the top of the tree, is shown is U.S. Pat. No. 2,707,008—by Bannister. The apparatus includes downwardly extending arm portions having knife edges at the lower edges thereof and which are adapted to pivot inwardly against the trunk of the trees to encircle the tree so that as the device is further lowered by the helicopter, the branches are severed from the tree by the downwardly moving cutting edges.

La Bounty, discloses in U.S. Pat. No. 4,198,747, a hydraulic shear for a backhoe including opposing concave shaped cutting blades which are pivoted about a common axis into cutting engagexent about a workpiece.

A device apparently for removing growth from a tree is also shown in U.S.S.R. Pat. No. 584,823.

SUMMARY OF THE INVENTION

The present invention comprises an apparatus which is lowered over the top of a tree by a device such as an aircraft or a ground operated boom, in order to remove a top portion of the tree and then to collect the severed top portion. The apparatus includes a conical housing having a vertically extending conical passageway which diverges in a downward direction to provide a larger opening at the bottom for guiding the top of the tree into the passageway. When the housing is in a position encircling the tree, a cutting assembly located across the top opening of the housing moves horizontally across the top to sever the tree trunk. In an exemplary embodiment, a spring biased arm is released when the tree is severed to thrust the severed tree top into a collecting basket attached to the outer side surface of the conical housing.

The cutting assembly includes a pair of arms which close in a scissor-like manner to bring the top portion of the tree into engagement with a cutting blade attached to one of the arms. In an exemplary embodixent, one of the arms is integrally fixed to the top of the conical housing. The other arm is pivotally connected to the conical housing and is closed by the retraction of a hydraulic piston. The closing action of the piston causes the movable arm to close about the tree and to move the top portion of the tree inwardly along respective inner surfaces of the movable and fixed arms to a location between opposing recessed locations on the inner surfaces of the arms. The tree top portion is rigidly held within the opposing recesses so that further closing movement of the movable arm displaces a cutting blade portion of the movable arm against the tree to sever the tree top portion. A two volume pump is utilized to provide a low pressure-rapid closing movement of the movable are into a cutting position, and a high pressure-slow acting movement to sever the top of the tree.

In another embodiment, a piston/cylinder assembly is utilized to operate a knife blade pivotally connected to the movable arm. After closing of the movable are to position the tree trunk at a location proximate to the knife edge, extension of the piston causes the knife blade to rotate into cutting engagement with the tree top.

In yet another embodiment, a helical spring is utilized in combination with a piston/cylinder assembly to assist in opening and closing the movable arm. When the movable arm is in an open position, the movable spring occupies a location outboard of an overcenter location to assist in holding the movable arm in the open position. Axial extension of the piston causes closing movement of the movable arm to displace the extension spring across the overcenter location to an inboard location. The resulting extension of the helical spring increases the rate of closing movement of the arm to decrease the time required for severing the tree trunk.

BRIEF DESCRIPTION OF THE DRAWINGS

These and other objects of the present invention will become more readily apparent upon reading the following detailed description and upon reference to the attached drawings in which.

Figure 9:
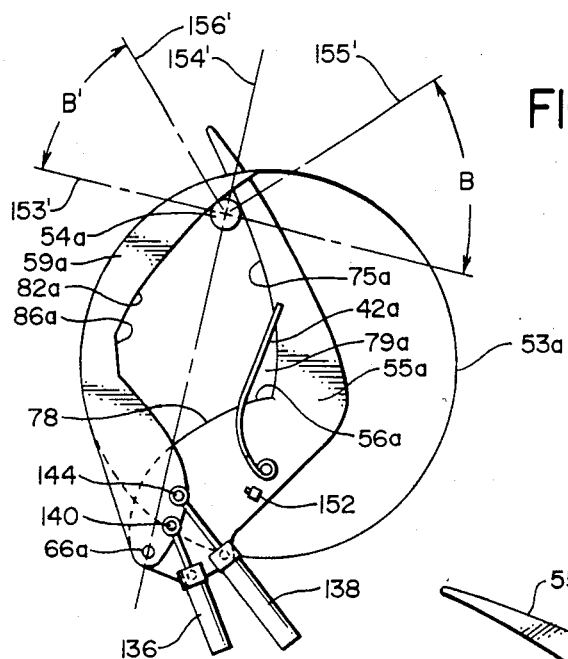
Figure 10:
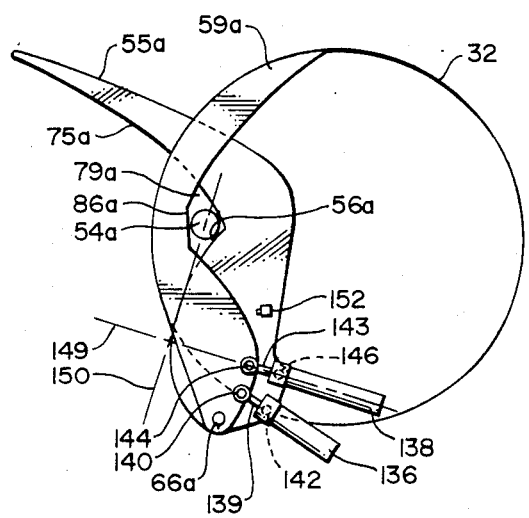
Figure 11:
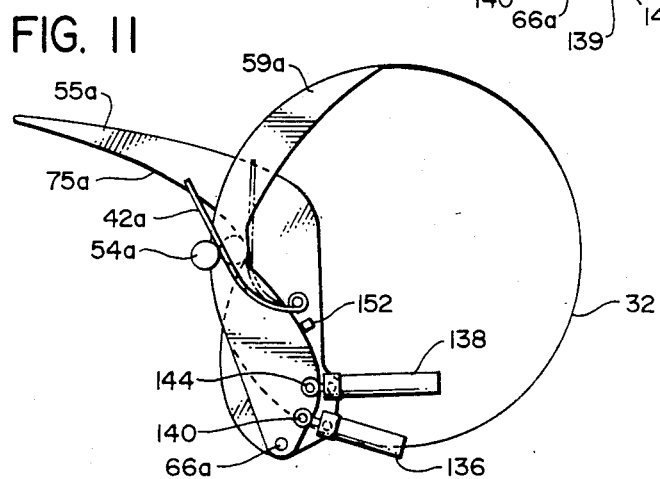
Figure 12:
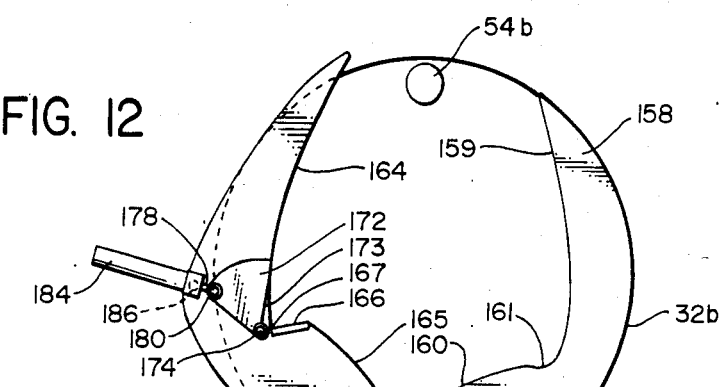
Figure 13:
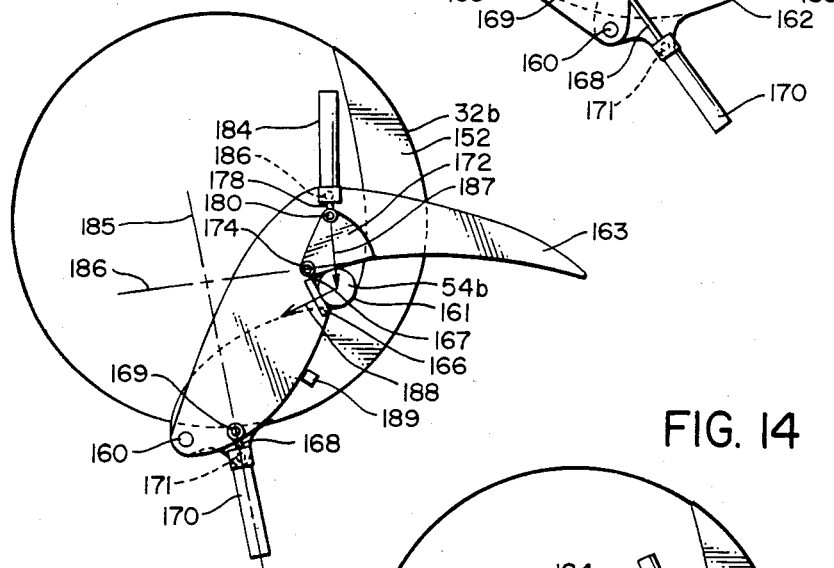
Figure 14:
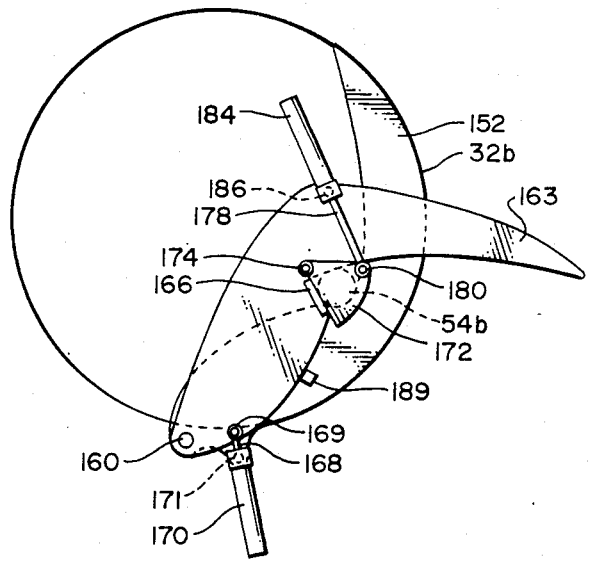
Figure 18:
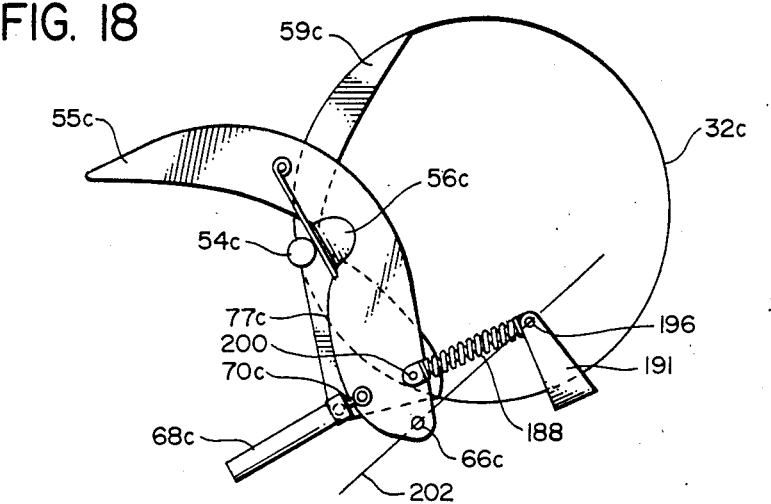

PIG. 5 is a bottom view of the exemplary embodiment of FIGS. 1 through 4 showing the downwardly diverging sides of the conical housing to define a conical passageway for encircling the tree;

FIG. 6 is a top view of the exemplary embodiment of FIGS. 1 through 5 showing the movable arm, the fixed arm, an arm actuating cylinder, and a top portion of the conical housing wherein a cutting member attached to the movable arm is in cutting engagement with a perimeter of the tree;

FIG. 7 is a top view of the embodiment shown in FIGS. 1 through 6 showing spring biasing means in an energy storage position in solid lines and an energy releasing position in phantom;

FIG. 8 is another exemplary embodiment of the present invention showing a pair of spaced apart engaging arms in a fully open position and having inner edges for engaging the tree, one of the engaging arms being fixed, the other engaging member being movable by a pair of actuating piston/cylinders;

FIG. 9 is a top view of the exemplary embodiment of FIG. 8 showing the movable engaging arm in a partially closed position;

FIG. 10 is a top view of the exemplary embodiment shown in FIGS. 8 and 9 wherein the fixed arm includes a blade in cutting engagement with the tree trunk at a perimeter surface of the tree;

FIG. 11 is a top view of the exemplary embodiment shown in FIGS. 8 through 10 showing a severed portion of the tree displaced laterally by spring biasing means;

FIG. 12 is a top view of another exemplary embodiment of the present invention showing a pair of engaging arms including a movable engaging arm having a hydraulically actuated pivotable cutting blade for severing the tree after the engaging arms are in a closed engaging position;

FIG. 13 is a top view of the exemplary embodiment shown in FIG. 12 showing the engaging arms in the closed engaging position in preparation for severing the tree by the pivotable cutting blade;

FIG. 14 is a top view of the exemplary embodiment shown in FIGS. 12 and 13, showing the cutting blade after having been pivoted into cutting engagement with the tree;

FIG. 15 is a top view of another exemplary embodiment of the present invention showing a fixed arm, and a movable arm, which is held in an open position by a hydraulic actuated piston in combination with a spring member occupying an overcenter position;

FIG. 16 is a top view of the exemplary embodiment shown in FIG. 15 wherein the movable arm is rotated to a partially closed position by retraction of the hydraulic piston so that the spring member is in alignment with an overcenter axis;

FIG. 17 is a top view of the exemplary embodiment shown in FIGS. 15 and 16 wherein the movable arm is shown in cutting engagement with the perimeter of the tree by retraction of the hydraulic piston and extension of the overcenter spring; and, FIG. 18 is a top view of the exemplary embodiment shown in FIGS. 15 through 17 wherein the top portion of the tree has been severed by the combined force of the hydraulically retracted piston and the extension of the overcenter spring member.

While the present invention is susceptible to various modifications and alternative forms, specific embodiments thereof have been shown by way of example in the drawings will herein be described in detail. It should be understood however, that it is not intended to limit the invention to the particular forms disclosed, on the contrary, the intention is to cover all modifications, equivalents, and alternatives falling within the spirit and scope of the invention as expressed in the appended claims.

DETAILED DESCRIPTION

The present invention relates to methods and apparatus for severing the top of a tree and collecting the severed portion by use of apparatus which is suspended over the top of a tree and then lowered downwardly around the tree in order to encircle the tree. The apparatus includes a pair of scissor-like arms which move a top portion of the tree into cutting engagement with a knife blade operatively connected to one or both of the arms to sever the top portion of the tree and to collect the severed top portion. The present invention will be described herein with reference to suspension of the apparatus from a helicopter; however it should be appreciated that other modes of suspension, such as from a boom device anchored to the ground, are within the scope of the invention.

Figure 1:
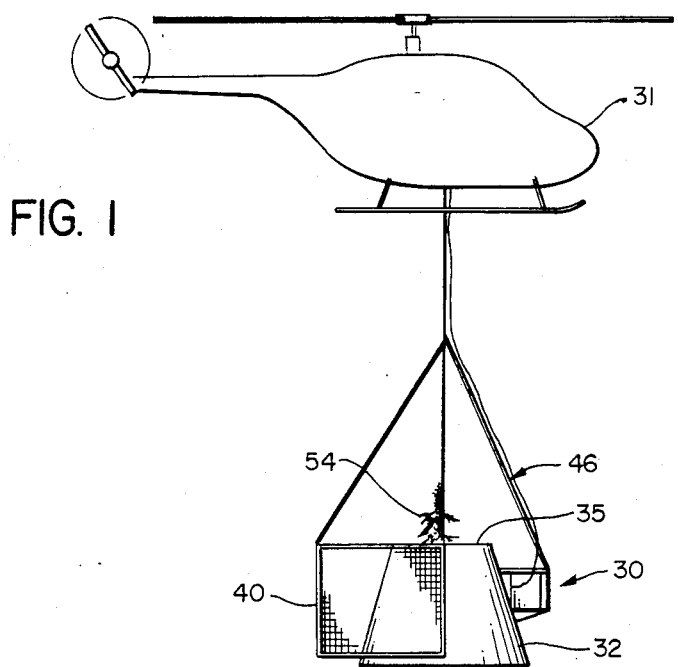
FIG. 1 is a pictorial side view of an exemplary embodiment of the present invention wherein a conical housing and cutting assembly are suspended by a helicopter so that the conical housing encircles a top portion of a tree.
Figure 2:
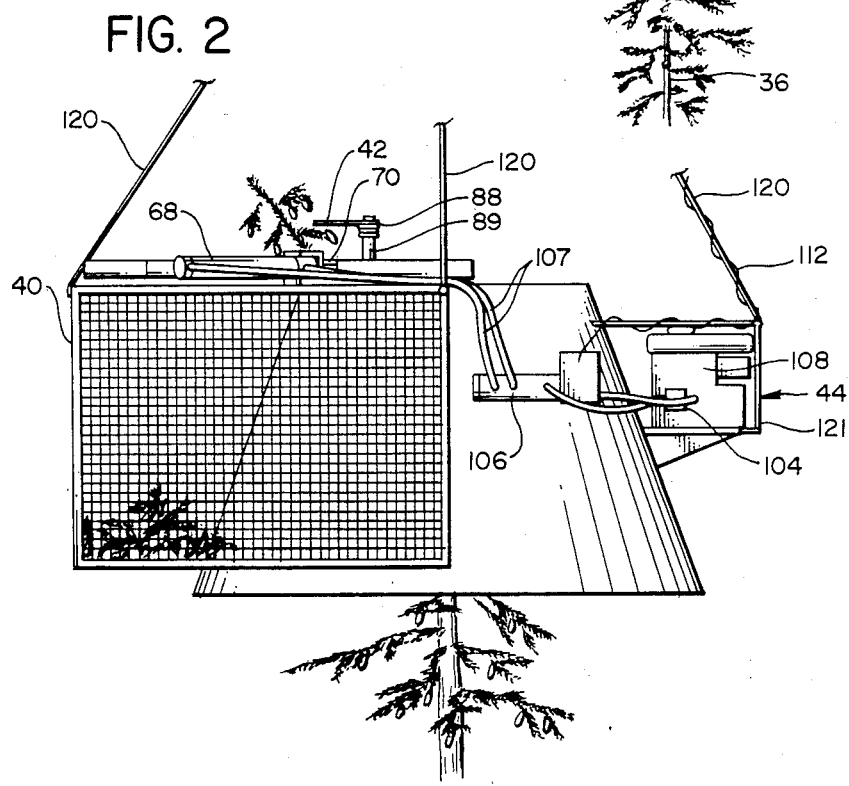
FIG. 2 is a pictorial side view of the exemplary embodiment shown in FIG. 1 illustrating the top portion of the tree being severed and thrust into a collection basket.

Referring to FIGS. 1 and 2, a cutting and collecting apparatus generally indicated at 30 is shown suspended from a helicopter 31. Cutting apparatus 30 includes a conical housing 32 having a conically shaped inner surface 34 (FIG. 5) which extends downwardly from an upper opening 35 and diverges outwardly to a lower, wider opening. Housing 32 may be advantageously lowered over a top of a tree 36 so that the tree 36 is encircled within housing 32 and the tree top extends upwardly through opening 35. Ihe severed tree tops are collected in a mesh-like basket 40 which is connected to an outer surface of conical housing 32 and which receives the severed tree tops in response to an outwardly thrusting action of a spring arm 42. Cutting apparatus 30 is powered by a motor assembly, indicated at 44, attached to a side of conical housing 32 at a location opposite from basket 40. Basket 40 and motor assembly 44 provide attachment points for suspension rigging indicated at 46 which is also attached to helicopter 31 to support cutting apparatus 30 as it is maneuvered to a position above and then downwardly around tree 36.

Figure 3:
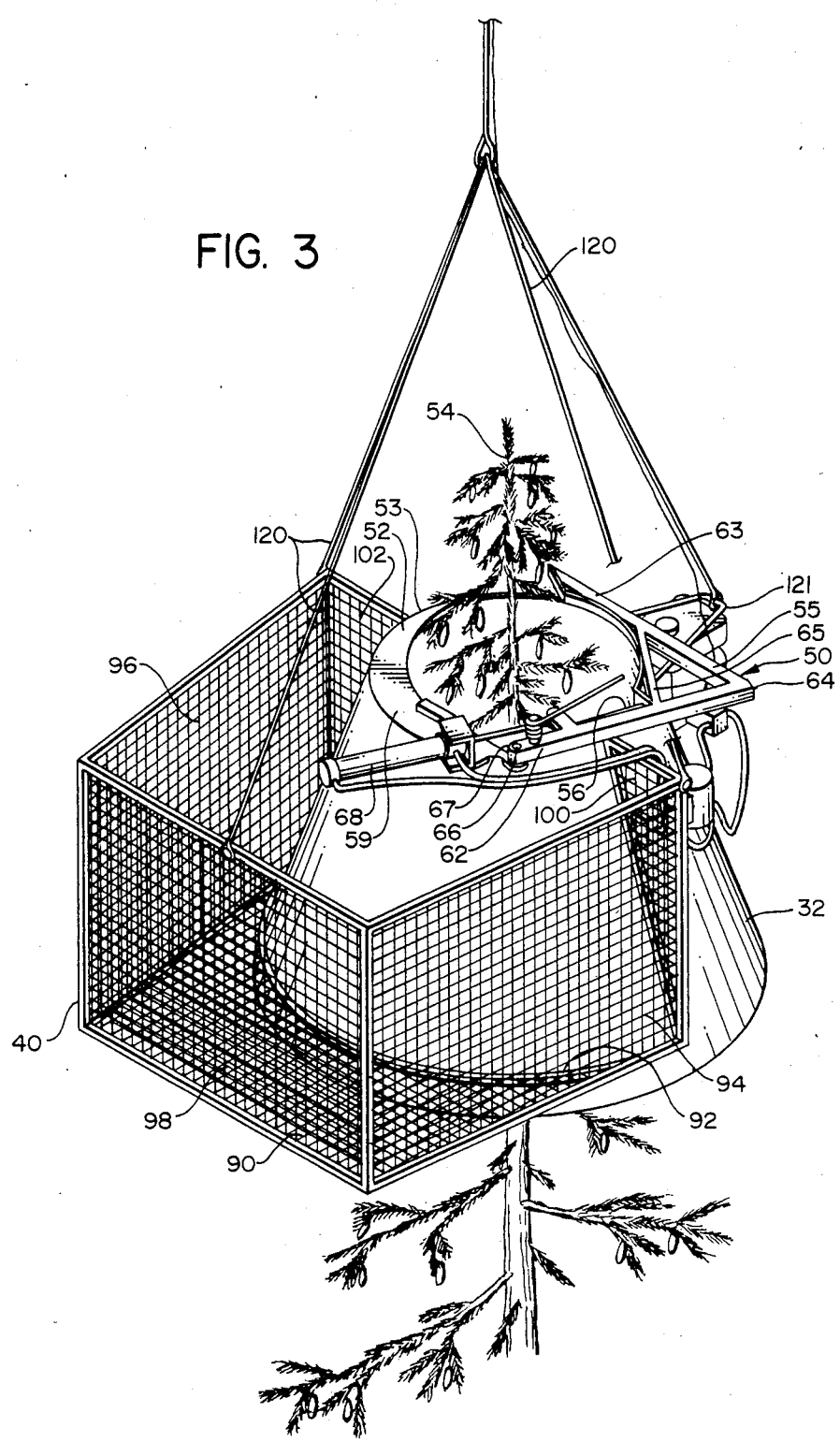
FIG. 3 is an isometric view of the exemplary embodixent shown in FIGS. 1 and 2.
Figure 4:
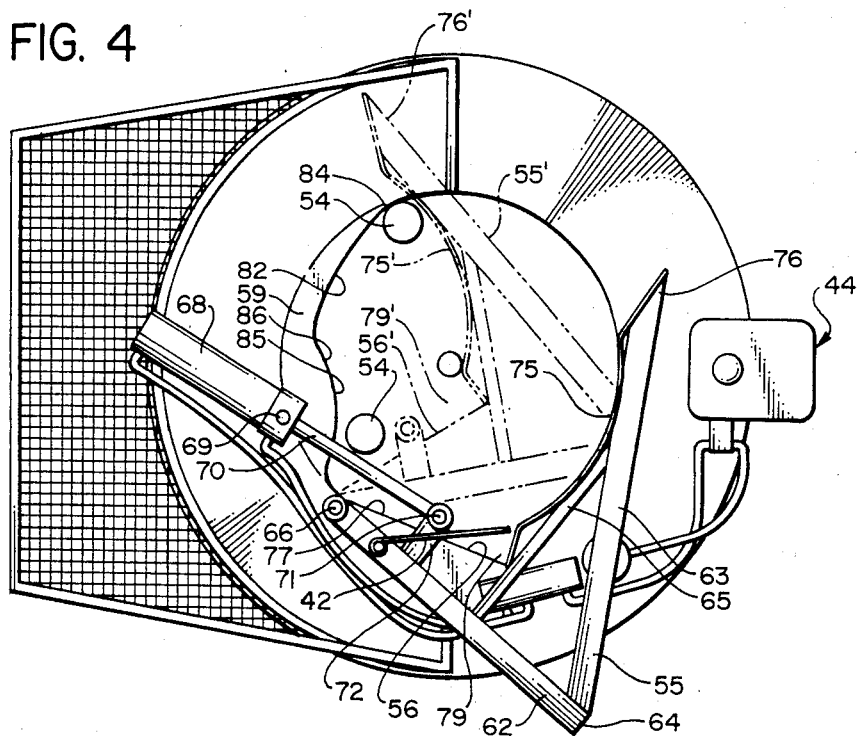
FIG. 4 is a top view of the exemplary embodiment of FIGS. 1 through 3 showing a fixed arm, and a movable arm in an open position in solid lines, and further showing the movable are in a partially closed position in phantom lines.
Figure 5:
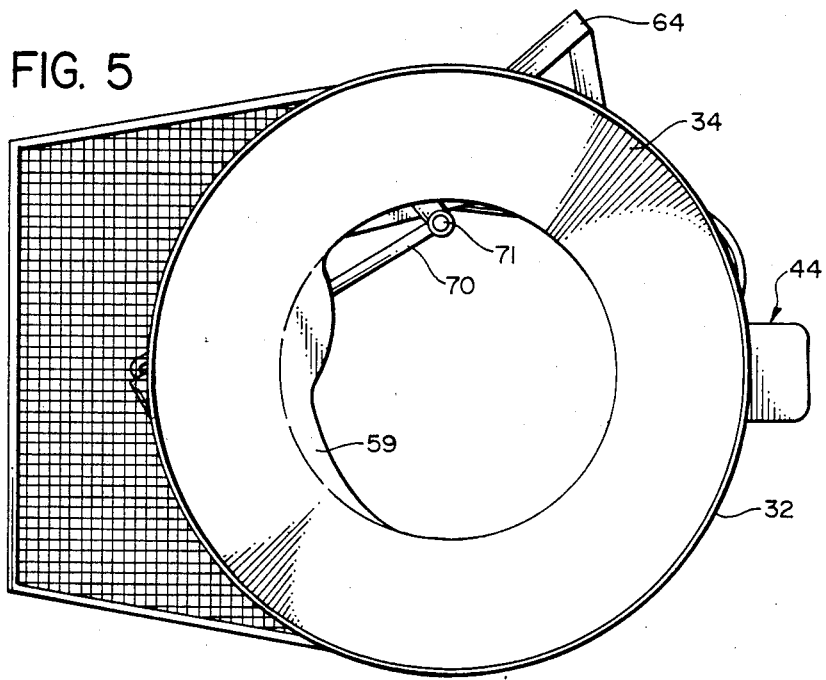

Tree 36 is severed at a desired location by a cutting assembly indicated at 50 and shown in FIGS. 3 and 4. Cutting assembly 50 is mounted to conical housing 32 by an integral flange portion 52 which extends horizontally across opening 35 at an upper lip 53 of housing 32. A top portion 54 of tree 36 is severed when a movable arm 55 pivots in a counterclockwise direction, when viewing FIG. 4, and moves top portion 54 toward a somewhat centrally located cutting blade 56 located along an inner edge recess of movable arm 55. To assist moving tree top portion 54 toward cutting blade 56, flange 52 includes an inner edge which forms an arm 59 for engaging top portion 54 when movable arm 55 pivots into contact with tree 36. Movable arm 55 includes a pair of linear members 62, 63 which are integrally joined at a vertex 64 and which are further supported by a cross brace 65 extending between members 62, 63. Support for moveable arm 55 is provided by a pivot connector 66 attached to a finger 67 extending integrally outward from flange 52 which allows movable arm 55 to pivot through a generally horizontal cutting plane.

In order to pivot movable arm 55 about pivot connector 66 between an "open" position shown in FIG. 3 where arm 55 is outside the perimeter formed by lip 53, and a "closed" position shown in FIG. 6 where tree top 54 is moved into cutting engagement with blade 56, a hydraulic cylinder 68 (FIG. 4) is pivotally connected at a connector 69 about a vertical pivot axis to a platform extending horizontally from flange 52. Cylinder 68 includes an axially extending piston 70 which is pivotally connected at a connector 71 to a finger 72 extending perpendicularly from linear member 62 inwardly within upper opening 35.

As shown in FIG. 4, movable arm 55 pivots from an open position shown in solid lines, in a closing direction to a tree engaging position shown in phantom and identified by numbers with a prime (') symbol. Movement of tree 54 into cutting engagment with blade 56 during closing movement of arm 55 is facilitated by the contour of the inner edge of xovable arm 55 which is formed by (i) a concave portion 75 extending generally inwardly from a tip 76 of linear member 63, and (ii) a linear portion 77 extending generally outwardly from pivot connector 66. In the present invention, the term "inwardly" defines a direction between arms 55, 59 generally towards pivot connector 66, whereas the term "outwardly" defines a direction generally away from pivot connector 66 between arms 55, 59. To engage tree 36 prior to severing tree top 54, a recess 79 is formed by the intersection of concave portion 75 and linear portion 77. Tree top 54 is severed by a linear cutting blade 56 which is attached to the edge of linear portion 77 at a location proximate to concave portion 75.

Tree top 54 is guided into cutting engagement with cutting blade 56 by scissor-like closing of movable arm 55 about pivot connector 66 towards fixed arm 59. To facilitate movement of tree top 54 toward cutting blade 56, fixed arm 59 includes an inner surface having (i) a concave portion 82 extending inwardly from an outer tip 84 of fixed arm 59 and (ii) a convex portion 85 extending in a generally outward direction from pivot connector 66. To rigidly engage top portion 54 when arm 55 is in the closed position, a linear retaining edge 86 joins concave portion 82 and convex portion 85.

The apparatus of the present invention operates in a manner that as movable arm 55 moves from the open position to the closed position, movable arm 55 and fixed arm 59 cooperate to move tree top 54 into engagement with recess 79 and retaining edge 86. In the event tree top portion 54 occupies an outward location, such as the eleven o'clock position shown in FIG. 4, closing movement of arm 55 causes inward movement of tree top 54 along cooperating concave surfaces 75, 82 until tree top 54 is engaged between recess 79 and retaining edge 86. On the other hand, should tree top 54 occupy an inward location, such as the location proximate to piston 70 shown in FIG. 4, closing movement of arm 55 causes tree top 54 to be displaced in an outward direction along piston 70 and cooperating surfaces 77, 85 until tree top 54 is engaged within recess 79 between cutting blade 56 and retaining edge 86 as shown in FIG. 6. Further movement of arm 55 in the closing direction causes tree top 54 to be severed by cutting blade 56 as shown in FIG. 7.

After being severed from tree 36, tree top 54 is thrust into basket 40 by an arm 42 which includes a spring base portion 88 (FIG. 2) helically wound about a pin 89 extending upwardly from linear member 62. Arm 42 includes an outer tip which is located forward from recess 79 (FIG. 4) a slight amount so that when tree top 54 is engaged within recess 79, arm 42 is displaced in a somewhat radially rearward direction to an energy storage position. Therefore when the top portion 54 is severed by cutting blade 56, the energy stored within arm 42 is released with sufficient force to cause the severed tree top 54 to be thrust outward into basket 40. In an alternate embodiment (not shown), arm 42 is rigidly mounted to pin 89 so that closing movement of movable arm 59 causes the rigidly xounted arm 42 to displace the severed tree top outwardly into basket 40.

As shown in FIG. 3, basket 40 is located opposite from spring arm 42 so that upon severing of the tree top 54, basket 40 is in position to receive the tree top 54 as it is displaced by spring arm 42. Basket 40 includes a mesh-like horizontal bottom portion 90 having an arcuate shaped inner end 92 which is adapted to fit about the outer surface of concave housing 32 in mating engagement therewith. Extending upwardly from bottcm portion 90 are opposite side walls 94, 96 which are integrally joined to an end wall 98 also extending upwardly from bottom portion 90. The enclosure formed by basket 40 is completed by an upwardly extending end wall 100 located between side wall 94 and the outer surface of conical housing 32, and an end wall 102 extending upwardly between side wall 96 and the outer surface of conical housing 32.

Piston 70 of hydraulic cylinder 68 is extended and retracted by a hydraulic pump 104 (FIG. 2) which is fluidly connected to hydraulic cylinder 68 via a selector valve 106 by inlet and return lines 107. Pump 104 is powered by a gasoline engine 108 rigidly secured to the outer surface of housing 32. Engine 108 is started prior to takeoff and remains running throughout the flight of helicopter 31. Control of hydraulic fluid from pump 104 to hydraulic cylinder 68 is accomplished by positioning selector valve 106 via a control line 112 which is attached to a control switch located in helicopter 31. The selector valve control switch is a three position switch including a "first" position where fluid is directed to hydraulic cylinder 68 to retract piston 70 thereby causing arm 55 to pivot about pivot connector 66 toward the closed cutting position; a "second" position where piston 70 is extended to move arm 55 to the open position shown in FIG. 3; and a "third" position where arm 55 is allowed to rotate freely between the open and closed positions.

Support of the collecting apparatus 30 beneath helicopter 31 is accomplished by individual rigging members 120 of suspension rigging 46 (FIG. 3) which are attached to collection basket 40 at a location near the middle of side wall 98 at the upper end thereof, as well as to corner locations formed by the intersections of side walls 96, 102 and side walls 94, 100. Further support is provided by another rigging member 120 which is attached to a support frame 121 extending outwardly from conical housing 32 and which supports motor assembly 108 (FIG. 2).

Operation of cutting apparatus 30 proceeds in a manner that prior to takeoff rigging members 120 are connected to an underside location of helicopter 31 and engine 108 is started. After takeoff and arrival at the desired location, helicopter 31 is maneuvered so that housing 32 is positioned above a selected tree 36. At that time, helicopter 31 descends to an appropriate altitude where tree top 54 extends upwardly through the passageway formed by inner surface 34 to a location above upper opening 35 so that the desired length of tree top 54 is located above the cutting blade 56. After lowering cutting apparatus 30 about tree 36, the pilot engages the pump selector valve switch to cause the piston to retract within cylinder 68, thereby rotating arm 55 about pivot connector 66. Sometimes air turbulence is encountered relatively close to the ground which may cause the aircraft to vary its hovered location above tree 36. This hovering movement may cause some displacement of tree top 54 within opening 35, however, regardless of the location of tree 36 within opening 35, the closing scissoring movexent of arm 55 from a location outside of lip 53 will insure that tree 36 is directed to a location between recess 79 and retaining edge 86 to allow severing by cutting blade 56. As tree top 54 is stabilized within recess 79, closing movement of arm 55 causes spring arm 42 to be displaced in a clockwise direction to a location shown in solid lines in FIG. 6. Further closing of arm 55 causes the top portion 54 to be severed, so that spring arm 42 is released to thrust the top portion 54 outwardly as shown in phantom in FIG. 7 and into the collecting basket 40. Once the severing operation has been completed, the pilot actuates the selector valve switch to move arm 55 outwardly to the open position in preparation for another cutting operation.

In the present embodiment shown in FIGS. 1 through 7, pump 104 is a two stage, two volume pump. During the initial closing of arm 55 to engage tree 36, pump 104 operates in a high volume-low pressure mode to rapidly close arm 55 into the cutting position. Once arm 55 engages tree 36, the pressure within pump 104 rapidly increases causing it to automatically switch to a high pressure mode to provide a sufficient cutting force to sever top portion 54 from tree 36.

In another exemplary embodiment of the present invention shown in FIGS. 8 through 10, wherein like elements shown in the previous embodiment are designated by like reference numerals with an "a" suffix attached, linear portion 77 of movable arm 55 is replaced by a convex portion 78 of movable arm 55a which cooperates with concave portion 85a of fixed arm 59a during closing movement of movable arm 55a to locate tree top 54a between cutting blade 56a and retaining edge 86a. Furthermore, the aforementioned cylinder 68 is replaced by (i) a low pressure-fast acting piston/cylinder assembly indicated at 136 which closes arm 55a in a rapid manner to engage tree top 54a between recess 79a and retaining edge 86a, and (ii) a slow acting-high pressure piston/cylinder assembly indicated at 138 which further pivots cutting blade 56a toward retaining edge 86a to sever top portion 54a. Rapid counterclockwise closing movement of movable arm 55a is achieved by retraction of a piston 139 of assembly 136; piston 139 being pivotally mounted to fixed arm 59a at a pivot location 140 outward from pivot connector 66a. Piston 139 is retracted within a cylinder 141 which is pivotally connected to movable arm 55a by a pivot connector 142. Further closing movement of movable arm 55a is achieved by retraction of a piston 143 of assembly 138; piston 143 being pivotally connected to fixed arm 59a at a location 144 outward from pivot location 140. Piston 143 is retracted by a cylinder 145 which is pivotally connected to movable arm 55a at a pivot location 146. During the aforementioned rapid closing movement, piston 143 moves freely within cylinder 145. However, when tree top 54a is engaged between recess 79a and retaining edge 86a as shown in FIG. 10, piston/cylinder assembly 138 is actuated either automatically, or manually by an operator in helicopter 31, to cause cutting blade 56a of movable arm 55a to sever top portion 54a as shown in FIG. 11. Movable arm 55a is located at an optimum cutting position as a result of rotation of piston/cylinder assembly 138 about pivot locations 144, 146 during closing of movable arm 55a. This optimum cutting position defines a location where an axial centerline 149 (FIG. 10), representing a force line of piston 143, is substantially perpendicular to a line 150 representing an imaginary extension of cutting blade 56a at a cutting location approximately one half way through tree top 54a. Furthermore, closing movement of movable arm 55a causes a saw-like action of blade 56a across tree top 54a to aid in severing tree top 54a.

To initiate movement of movable arm 59a to the open position, a limit switch 152 is mounted on top of arm 55a to engage arm 59a when tree top 54a has been severed. Engagement of limit switch 152 sends a signal to selector valve 106 (FIG. 1) to extend piston 139 thereby returning arm 55a to the open position.

In the present exbodiment it is desirable during the closing scissoring movement of arm 55a, that the coefficient of friction between tree top 54a and arms 55a, 59a be sufficiently low so that tree top 54a will not jam between arms 55a, 59a, particularly when tree top 54a is located in an outward location as shown in FIG. 9, or inward location shown in PIG. 8. To facilitate movement of the tree top 54a along the inner surfaces of arms 55a, 59a, it is desirable that their respective inner surfaces be configured so that the tangents of angles B, B' are greater than the coefficient of friction between tree top 54a and each of the inner surfaces of arms 55a, 59a. When tree top 54a is located at the inward location shown in FIG. 8, angles B, B' have their vertices located at the axial center of tree top 54a and they are defined by the intersection of (1) a first line 153 extending in a perpendicular direction from a line 154 which extends through pivot connector 66a and an intersection point of convex surfaces 78, 85a, and (2) a pair of second lines 155, 156 extending perpendicularly from convex surfaces 78, 85a, respectively. On the other hand, when tree top 54a is located at the outward location within housing 32a, angles B, B', as shown in FIG. 9, are angles defined by the intersection of (1) a line 153' extending in a perpendicular direction from a line 154' which extends through pivot connector 66a and an intersection point of concave surfaces 75a, 82a, and (2) a pair of second lines 155', 156' extending perpendicularly from concave surfaces 75a, 82a, respectively. It has been found that when the coefficient of friction between the inner surfaces of arms 55a, 59a and tree top 54a is approximately 0.7, angles B, B' of 55° most favorably facilitate movement of tree top 59a along the inner surfaces of arms 55a, 59a toward recess 79a and retaining edge 86a.

In another exemplary embodiment of the present invention shown in FIGS. 12 through 14, like members shown in previous figures are identified by like numerals with the suffix "b" attached thereto. In the present embodiment, the positions of the movable arm and fixed arm are reversed from previous embodiments. Therefore a fixed arm 158, integrally connected to housing 32b, includes an inner edge having an outward concave portion 159, an inward convex portion 160, and a recessed portion 161 extending therebetween for engaging tree top 54b. Pivotally connected to an inward end 162 of fixed arm 158 is a movable arm 163 having an inner edge which includes an outward concave portion 164, an inward convex portion 165, and a linear retaining portion 166 located generally perpendicular to concave portion 164 to form a corner 167 and integrally joining concave portion 164 and convex portion 165. Closing clockwise movement of the movable arm 163 is accomplished by retraction of a piston 168, which is connected at a pivot location 169 to movable arm 163 at an inward end thereof, by a cylinder 170 which is pivotally connected to fixed arm 158 at a pivot connector 171. Closing movement of the movable arm 163 by retraction of piston 168 causes the tree top 54b to be engaged between recessed portion 161 and corner 167 and against retaining portion 166.

In order to sever tree top 54b, movable arm 163 includes a triangularly shaped cutting blade 172 having a cutting edge 173 and which is pivotally connected to movable arm 163 by a pivot connector 174 at a location proximate to corner 167. Once tree 54b is engaged between recess 161 and corner 167, a piston 178, which is pivotally connected to cutting blade 172 at a vertex 180 thereof, causes rotation of cutting blade 172 in a clockwise direction toward retaining portion 166 to a location shown in FIG. 13 thereby engaging tree top 54a; further clockwise rotation of cutting blade 172 as shown in FIG. 14 severs tree top 54b. Piston 178 is actuated by a cylinder 184 which is pivotally connected to movable arm 163 rearward of pivot connector 180 at a pivot connector 186. It can be appreciated that a larger cutting force is achieved by closing movement of cutting blade 172 as compared to the cutting force achieved by movable arm 55 and blade 56 in previous embodiments. This is due to the relatively short lever arm of cutting blade 172 as compared to the lever arm defined by the distance between pivot connector 66 and cutting blade 56 in the previous embodiments.

A further understanding of the unique properties of the present embodiment is provided by discussion of the force components generated by (i) piston 168 when maintaining movable arm 163 in the closed position shown in FIG. 13 where tree top 54b is positioned between recess 161 and corner 167, and (ii) piston 178 when pivoting cutting blade 172 to sever tree top 54a as shown in FIG. 14. During closing movement of movable arm 163, piston 168 and cylinder 170 pivot in a counterclockwise direction when viewing FIG. 13 so that when movable arm 163 is in the closed position, piston 168 is positioned to generate a closing force along an axial centerline 185 (FIG. 13) of piston 168. Force line 185 is generally perpendicular to an imaginary extension 186 of cutting blade 172 when cutting blade 172 engages the outer perixeter of tree top 54b in preparation for severing.

During an initial portion of the rotation of cutting blade 172 through tree top 54b, a force component represented by a vector 187 is generated which has a substantial alignment component which is opposed by the closing force component 185 of piston 168. During a later portion of the movement of the cutting blade 172 through tree top 54b, a force component represented by a vector 188 is generated which has a substantial alignment component which is opposed by retaining edge 166. This insures that tree top 54b remains stationary when engaged by cutting blade 172 throughout the severing operation.

Another exemplary embodiment of the present invention is shown in FIGS. 15 through 18 wherein like members shown in previous figures are identified by like numerals with the suffix "c" attached thereto. In the present embodiment, in order to rapidly close movable arm 55c, a helical spring 190 is connected to a horizontal flange 191 which in turn is connected to an upwardly extending flange portion 192 secured to the outer surface of conical housing 32c. Spring 190 occupies an overcenter position which aids the retention of movable arm 55c in an open position shown in FIG. 15. Flange 191 at a distal end 194 includes a pivot connector 196 which is connected to helical spring 190 at a location near convex surface 77c. The other end of spring 190 is connected to movable arm 55c by a pivot connector 200 located near an outer edge 201 of movable arm 55c. Rotation of movable arm 55c in the counterclockwise direction when viewing FIG. 15, causes movement of pivot connector 200 past an overcenter position represented by a line 202 where pivot connector 200 is in alignment with pivot connectors 66c and 196 as shown in FIG. 16, to a location shown in FIG. 17 where pivot connector 200 is inboard of the overcenter position 202. The resulting bias extension of spring 190, shown in FIG. 18, assists arm 55c to move rapidly in the closing direction, which together with the closing force applied by retraction of piston 70c within cylinder 68c, speeds up the cutting process thereby decreasing the amount of time which helicopter 31 must hover above tree 36.

Other similar embodiments not disclosed herein are a part of the present invention. For example, instead of utilizing a fixed arm and a movable arm, it is also within the scope of the invention to utilize two movable arms operating in a scissor-like movement between the open and closed positions. Each arm may utilize one or more piston/cylinder assemblies as disclosed in previous embodiments. Other combinations of movable/fixed arms utilizing one or more piston/cylinder assemblies and movable cutting blades as described in various embodiments in the present application are also within the scope of the present invention.

What is claimed is:
1. Apparatus for cutting a tree comprising:
 a. tree locating means including, (1) a housing adapted to be lowered over a top portion of the tree so as to retain the top portion within a down- wardly extending opening of said housing, and (2) a first arm movably connected to said housing for movement in a first closing direction in said opening to engage the tree in a manner to direct the top portion within said opening to a first location; and b. tree cutting means including (1) a cutting member operatively connected to said tree locating means, and (2) means for moving said cutting member into cutting engagement with the tree at the first location to sever the top portion from the tree.

2. The apparatus as set forth in claim 1 wherein said cutting member is attached to said movable arm at the first location.

3. The apparatus as set forth in claim 1 wherein said cutting member is attached to said housing at said first location.

4. The apparatus as set forth in claim 1 wherein:
a. movement of said first arm in a first closing direction causes the top portion of the tree to be cooperatively engaged between said first arm and said housing; and
b. said first arm and said housing are configured so that the top portion is cooperatively guided between said first arm and said housing to the first location during movement of said first arm in the closing direction.

5. The apparatus as set forth in claim 1 wherein:
a. said housing is operatively connected to a second arm in a manner that movement of said first arm in said closing direction causes the top portion to be cooperatively engaged between said first and second arms; and
b. said first and second arms include first and second repective opposing edges which are configured to cause the top portion to be cooperatively displaced along said first and second edges towards the first location during closing movement of said first arm.

6. The apparatus as set forth in claim 5 wherein:
a. said first arm is connected to said second arm at a first pivot location for pivotal scissor-like movement with respect to said second arm in said closing direction;
b. said first and second opposing edges each include an inner portion, an outer portion, and a middle portion extending between said inner portion and said outer portion;
c. each of said outer portion edges has a generally concave configuration so that when the tree is located between said outer portion edges, the top portion is caused to move inwardly during closing movement towards said middle portion to be engaged by said cutting member; and
d. each of said inner portion edges has a generally convex configuration so that when the tree is located between said inner portion edges, the top portion is displaced outwardly during said closing movement toward said middle portion to be engaged by said cutting member.

7. The apparatus as set forth in claim 6 wherein:
a. said concave configuration of each of said outer portion edges is defined by the equation $\tan B_1 > u$, where (1) u is a coefficient of friction between the top portion and said outer portion edges, (2) a first reference line extends between said first pivot location and a location where the respective outer portion edges of said first and second arms intersect during closing movement, and (3) $B_1$ is an angle formed by the intersection at an axial center of the top portion of a second reference line extending perpendicularly from said outer portion edge and a third reference line which is perpendicular to the first reference line;
b. said convex configuration of each of said inner portion edges is defined by the equation $\tan B_2 > u$ where (1) u is the coefficient of friction between said top portion and said inner portion edge, (2) a fourth reference line extends between the said first pivot location and a location where the respective convex surfaces of said first and second arms intersect during said closing movement, and (3) $B_2$ is an angle formed by the intersection at an axial center of the top portion of a fifth reference line extending perpendicularly from said inner portion edge, and a sixth reference line which is perpendicular to the fourth reference line.

8. Ihe apparatus as set forth in claim 7 wherein:
a. $B_1 = 55°$ when the coefficient of friction between the top portion and each of said outer portion edges is 0.7; and
b. $B_2 = 55°$ when the coefficient of friction between the top portion and each of said inner portion edges is 0.7.

9. The apparatus as set forth in claim 6 wherein said middle portion edge of said first arm forms said cutting member.

10. The apparatus as set forth in claim 6 wherein said middle portion edge of said second arm forms said cutting member.

11. The apparatus as set forth in claim 6 wherein said middle portion edge of said first arm is recessed relative to said inner and outer portion edges of said first arm to engage the top portion therein when the top portion is displaced along said first and second arms during closing movement of said first arm.

12. The apparatus as set forth in claim 11 wherein said middle portion edge of said second arm is recessed relative to said inner portion and outer portion edges of said second arm to engage the top portion when the top portion is displaced along said first and second arms during closing movement of said second arm.

13. The apparatus as set forth in claim 5 wherein said second arm is movably connected to said housing for movement in a second closing direction opposite to said first closing direction to engage the top portion between said first and second arms during movement of said first and second arms in said respective first and second closing directions.

14. The apparatus as set forth in claim 1 wherein:
a. movement of said first arm in said closing direction is caused by actuation of a fluid piston connected to said first arm; and
b. said piston is fluidly actuated by pump means having a first fast acting mode to rapidly move said first arm in said closing direction to engage the tree at the first location, and a second high pressure mode for moving said first arm further in said closing direction to sever the top portion.

15. The apparatus as set forth in claim 1 wherein:
a. movement of said first arm in said closing direction is caused by actuation of a first piston operating in a high speed mode to move said first arm rapidly to said first location; and
b. said severing of said top portion by movement of said first arm in said closing direction is caused by actuation of a second piston operating in a high pressure mode to move said first arm against said cutting member.

16. The apparatus as set forth in claim 1 wherein said first arm includes a biasing arm which engages the tree in advance of said first arm during movexent of said first arm in said closing direction causing said biasing arm to store energy when said first arm engages the tree so that when said top portion is severed from the tree the stored energy is released causing the severed top portion to be displaced from said housing.

17. The apparatus as set forth in claim 1 additionally comprising basket means, operatively connected to said frame, for collecting the tree top after the tree top has been severed.

18. The apparatus as set forth in claim 1 wherein:
  a. said housing is adapted to be lowered over the top portion by an aircraft; and
  b. said housing includes connecting means extending between said aircraft and said housing for suspending said housing from the aircraft.

19. The apparatus as set forth in claim 18 additionally comprising control means located in the helicopter for controlling opening and closing movement of said first arm.

20. The apparatus as set forth in claim 6 wherein said cutting member is operatively connected to said first arm at a location near said first location to permit movement of said first arm into cutting engagement with the top portion of the tree when the top portion is engaged between said middle portion edges.

21. The apparatus as set forth in claim 1 additionally comprising means for spring biasing said first arm in said first closing direction to increase the rate of movement of said first arm in said first closing direction.

22. The apparatus as set forth in claim 21 wherein:
  a. said biasing means includes a spring attached to said housing at a first pivot location and to said first arm at a second pivot location;
  b. said first arm is pivotally connected to said housing at a third pivot location;
  c. an imaginary line extending between said first pivot location and said third pivot location defines an overcenter location; and
  d. said movement of said first arm in said closing direction causes said second pivot location to move past said overcenter location to bias said first arm in said closing direction.

23. The apparatus as set forth in claim 1 wherein said first arm includes a member rigidly mounted to said first arm which engages the tree top in advance of said first arm during movement in said closing direction and which displaces the top portion outwardly from said housing after the top portion has been severed.

24. A method of cutting a tree comprising the steps of:
  a. lowering a housing over a top portion of the tree so as to retain the top portion within a downwardly extending opening of the housing; and
  b. moving a first arm in a first closing direction in the opening to engage the top portion in a manner to cause the top portion to be displaced to a first location between the housing and the first arm; and
  c. moving a cutting member into cutting engagement with the tree at the first location to sever the top portion from the tree.

25. The method as set forth in claim 24 wherein:
  a. the movement of the first arm in the first closing direction causes the top portion to be slidably engaged between the first arm and the housing; and b the first arm and the housing are configured so that the top portion is cooperatively slidably guided to the first location between the first arm and the housing during the movement of the first arm in the closing direction.

26. The method as set forth in claim 25 additionally comprising the step of engaging the tree with a biasing member in advance of the first arm during the movement of the first arm in the closing direction causing the biasing member to store energy when the first arm engages the tree so that when the top portion is severed from the tree the stored energy is released to cause the biasing member to displace the severed top portion from the housing.

27. The method as set forth in claim 25 additionally comprising the step of collecting the tree top in a basket attached to the housing after the tree top has been displaced by the biasing means.

28. The method as set forth in claim 27 additionally comprising the step of suspending the housing from an aircraft in order to lower the housing over the top portion of the tree.

29. The method as set forth in claim 25 wherein:
  a. the housing is suspended from an aircraft over the top portion of the tree; and
  b. the movement of the first arm is controlled from the aircraft.

30. The method as set forth in claim 29 additionally comprising the step of biasing the first arm in the first closing direction to increase the rate of movement of the first arm in the closing direction.

* * * * *